United States Patent
Peck

(10) Patent No.: US 12,236,385 B2
(45) Date of Patent: Feb. 25, 2025

(54) DYNAMICALLY CONFIGURABLE PUT WALL FOR FULLFILMENT

(71) Applicant: Fastfetch Corporation, Pendleton, SC (US)

(72) Inventor: John C. Peck, Seneca, SC (US)

(73) Assignee: Fastfetch Corporation, Pendleton, SC (US)

( * ) Notice: Subject to any disclaimer, the term of this patent is extended or adjusted under 35 U.S.C. 154(b) by 963 days.

(21) Appl. No.: 17/194,720

(22) Filed: Mar. 8, 2021

(65) Prior Publication Data

US 2021/0276804 A1 Sep. 9, 2021

Related U.S. Application Data

(60) Provisional application No. 62/986,714, filed on Mar. 8, 2020.

(51) Int. Cl.
*G06Q 10/08* (2024.01)
*B65G 1/137* (2006.01)
*G06Q 10/087* (2023.01)

(52) U.S. Cl.
CPC ........... *G06Q 10/08* (2013.01); *B65G 1/1373* (2013.01); *G06Q 10/087* (2013.01)

(58) Field of Classification Search
CPC .... G06Q 10/08; G06Q 10/087; B65G 1/1373; B65G 1/137
See application file for complete search history.

(56) References Cited

U.S. PATENT DOCUMENTS

| | | |
|---|---|---|
| 5,505,473 A | 4/1996 | Radcliffe |
| 5,877,962 A | 3/1999 | Radcliffe |
| 6,157,915 A | 12/2000 | Bhaskaran et al. |
| 6,615,104 B2 | 9/2003 | England et al. |
| 6,775,588 B1 | 8/2004 | Peck |
| 7,647,752 B2 | 1/2010 | Magnell |
| 8,019,463 B2 | 9/2011 | Peck |
| 8,594,835 B2 | 11/2013 | Lert |
| 9,914,278 B2 | 3/2018 | Pettersson et al. |
| 9,919,872 B2 | 3/2018 | Khodl et al. |

(Continued)

OTHER PUBLICATIONS

Honeywell, Order Picking and Consolidation, webpage, 2019.
Honeywell, Future-proof Your DC With Voice-Directed Workflows, white paper, 2020.

*Primary Examiner* — Jacob S. Scott
*Assistant Examiner* — Erin Morris
(74) *Attorney, Agent, or Firm* — Kim and Lahey Law Firm, LLC; Douglas W. Kim

(57) ABSTRACT

This system is a dynamically sized put wall comprising: a put wall having a plurality of slots; a slot defined by a first end and a laterally movable/removable divider; a light bar attached to the put wall and in communications with a put wall controller and a server; a set of server computer readable instructions that, when executed by a server processor included in the server, are adapted for receiving or determining a desired width for one or more slots in the put wall; actuating a light segment within a light bar representing a desired slot dimension; receiving an acknowledgement that the laterally movable/removable divider(s) were positioned according to the light segments actuated by the put wall controller, and, placing the put wall controller into put mode.

17 Claims, 5 Drawing Sheets

(56) References Cited

U.S. PATENT DOCUMENTS

| | | |
|---|---|---|
| 10,494,192 B2 | 12/2019 | DeWitt et al. |
| 2013/0338819 A1* | 12/2013 | Max .................. G06F 7/00 |
| | | 700/216 |
| 2014/0350717 A1 | 11/2014 | Dagle et al. |
| 2016/0176562 A1 | 6/2016 | Pettersson et al. |
| 2017/0015502 A1* | 1/2017 | Engel .................. B65G 1/10 |
| 2018/0286002 A1 | 10/2018 | Peck |
| 2019/0300284 A1 | 10/2019 | Peck |

\* cited by examiner

DYNAMICALLY CONFIGURABLE PUT WALL FOR FULLFILMENT

RELATED APPLICATION

This is a non-provisional patent application from U.S. provisional patent application Ser. No. 62/986,714 filed Mar. 8, 2020 incorporated by reference.

BACKGROUND OF THE SYSTEM

1) Field of the System

This system is directed to a dynamically configurable put wall for order fulfillment with slots that can be configured in real time according to order or sub-orders.

2) Description of the Related Art

E-commerce and online sales have enjoyed an explosive growth that has been reported to be three times the rate of total retail sales according to a report issued by Tompkins Supply Chain Consortium. This trend, however, is also increasing the pressure on retailers and vendors in the areas of order fulfillment, returns processing and meeting the quick turnaround time expected by consumers. According to one digital publication, online spending represented 16.0% of total retail sales for the year 2019. In order to meet these order fulfillment demands, attempts to improve the order fulfillment efficiencies have been presented such as shown in United States Patent Application Publication 2014/0350717. There have also been attempts to automate the order fulfillment process such as shown in U.S. Pat. Nos. 10,494,192 and 9,919,872. These attempts include an order fulfillment system and method of fulfilling orders, each with at least one article, includes at least one mobile robotic unit that is capable of autonomous routing in an order fulfillment facility. These attempts include a method and apparatus which are provided for sorting items to a plurality of sort destinations.

One general approach to improving efficiency in order fulfillment is the use of one or more put walls as shown in FIG. 1A. A put wall can be a frame 00 including a plurality of openings 01, containers 02, or other articles or structures for receiving and storing items. The openings in the frame can be defined by a bottom shelf 03, top shelf 04, side wall 05, divider 06 or some combination. The openings are commonly referred to as slots (e.g., cubby holes of mailboxes in a post office) and can be arranged in vertical rows where each row can include one or more slots into which items are sorted and placed so as to group items for an order. Slots may be open on at least one end.

One potential advantage of a put wall is that is can be used in a goods-to-person system used to handle large volumes of orders in a small footprint. This advantage assists in increasing efficiency when large orders are broken down into smaller components (e.g., sub-orders) where each sub-order is picked independently and placed in a separate shipping container. The number of items in some orders precludes the ability to ship an entire order in a single container. In some cases, the order can contain a single item.

Put wall processes separate the picking, sorting and packing processes of order fulfillment and seek to maximize efficiency of some applications in warehouse order fulfillment processing. Traditionally, put wall slots are usually fixed and uniform in size. The slot sizes are usually determined by the size of the maximum capacity order of items to be put into the slot. However, online and ecommerce orders usually only have a small number of items so that when using these large, fixed size slots, the density of the put walls is often very low. This low density results in a great deal of unused space in many put wall slots. It would be advantageous to have a put wall with dynamically sized slots where the slot size can be modified depending on the volume and dimensions of the items to be placed into a slot for a particular order. Dynamic slot sizes would in turn enable a put wall to contain more slots and be able to sort and assemble more orders.

A put wall is typically comprised of multiple slots having associated light indicators 07 (FIG. 1B) where each slot in the put wall can represent an order. The light indicator can be those described in U.S. Pat. Nos. 6,775,588 and 8,019,463 and United State Patent Application Publication 2019/0300284, incorporated herein by reference. An actuator can be a proximity-based actuator 08 or be a button 09 that requires a physical touch to provide the functionality described in U.S. Pat. Nos. 6,775,588 and 8,019,463 and United State Patent Application Publication 2019/0300284.

A batch of items that have been picked in bulk for multiple customer orders and requires sorting into customer orders is presented to a worker in totes or pallets. The worker can identify the individual items, such as with a scanner, and a container or location on the put wall will be indicated informing the worker where to place the item(s). The worker can be directed by a light system such as shown in United States Patent Application Publication 2017/0015502 and 2018/0286002 and U.S. Pat. Nos. 6,775,588 and 8,019,463. However, these implementations of slots on the put wall are statically sized. Further, the light systems that are used for indicating where items are to be placed are attached to a fixed location on the put wall, resulting in fixed sized slots with fixed dimensions that cannot be quickly and automatically adjusted.

The disadvantages of the prior art are that the slots are either static, are not configured based upon orders or cannot be easily associated with light assemblies or light bars associated with each slot. When a traditional put wall is configured, the slots dimensions are defined at installation without regard to the orders to be fulfilled. Therefore, when orders are being filled, slots can be unnecessarily large for the items in the orders resulting in lower densities and fewer orders being present in the physical space of the put wall. One attempt to improve the slot size is shown in U.S. Pat. No. 8,594,835 which discloses a control system for storage and retrieval system. However, the storage area is controlled by a controller that makes no consideration whatsoever for a light assembly or light bar associated with the slots. Therefore, an indicator that shows a worker where an item is located and which item to pick cannot be used with this system as there is no ability to associate the indicator with the modifiable slot.

It would be advantageous to have a system that allows for dynamically dimensioned slots associated with light assemblies or light bars to maintain the functionality of a put wall with improved efficiencies and increased order or sub-order capacity.

Therefore, it is an object of the present system to provide for a system to dynamically adjust put wall slot sizes, thus increasing the number of put wall slots, based upon the orders to be fulfilled while maintaining the functionality of associated light assemblies or light bars.

It is another object of the present system to provide for a system that can use a light assembly or light bar to inform a worker where to place dividers between slots.

BRIEF SUMMARY OF THE SYSTEM

The above objectives are accomplished by providing dynamically sized slots in a put wall comprising: a put wall having a plurality of slots; a slot defined by a first end and a movable/removable divider; a light bar or a light assembly attached to the put wall and in communications with a put wall controller and a server. The light bar can be a series of light including LED lights. The light assembly can include a light bar and a display. The display can include alpha numeric characters. The system can include a set of light bars or a set of light assemblies; a set of server computer readable instructions that, when executed by a server processor included in the server, compute a desired width for one or more slots in the put wall; actuating a light segment within a light bar representing a desired slot width; and, placing the put wall controller into put mode. Put mode can be the mode where the light assembly illuminates light segments to identify where to place items. Configuration mode can be an initial mode or setup mode where the light controller illuminates an initial light bar segment to indicate where to place one or more dividers to define slot dimensions and thus separate slots. The initial light bar segment can be one or more lights in the light bar.

The put wall controller can be affixed to the put wall or can be in communication with components of the put wall such as the light assembly, light bar, display, and any combination. The put wall controller can include a processor, display, computer storage, ports, power input, connectors, intern power source, fans, buttons, inputs, and any combination. The controller can include controller computer readable instructions that, when executed by a processor, provide the functionality that is described herein.

The system can include vertical movable shelves and a rear light assembly, light bar, display or other visual indicator disposed on a rear side of the put wall configured to indicate when a slot contains items for an order to be shipped. The slot can include items that can be included in an order having a status of a completed order, a partially completed order, a shorted order to be shipped with missing items, an order to be held awaiting arrival of missing items and any combination. When the slot contains items that are in a completed order, the items can be placed in a container and shipped. When the slot includes items for an order that is to be held, the items can be placed on a container or other area and held from shipping.

In one embodiment, the put wall can include a container indicator that can inform a worker of the container type or container size to use to place the items that are retrieved from the slot and placed into the container. The container can be any number of shapes, sizes and materials. Order includes a list of items with item attributes such as physical dimensions and weight. The controller, order management system or other computer system can determine a container size according to the dimensions and weight of the items in the slot and recommend the container to the worker. The worker can select the container, place the items into the container and input a container identifier that can be used to associate the container with the order associated with the slot. For example, the worker can select a label, place the label on the container and scan the label. The label can include an indicator such as a barcode, QR code, RFID or other indicium. Therefore, the container is then associated with the order whose items are being retrieved from the slot and placed in the container. The controller can indicate or recommend a container according to the order items in the slot and any combination. The container can be indicated or recommended when the slot contains an order in any status described above.

An order that is incomplete and short can be shipped, with some items in the order backordered. An "order" can in fact be a sub-order of a larger order. For example, if an order includes a number of items that can be more efficiently shipped in two or more containers, the system can break the order into sub-orders and assign a slot to each sub-order. Therefore, the items in the initial order will be placed on two or more containers for shipping. Sub-orders may be created according to the size, weights, type of other attributes of the items in the initial order. The system can include a set of server computer readable instructions which includes instructions for determining the desired slot dimensions according to the ordered items dimensions. The set of server computer readable instructions can include instructions for determining the desired slot dimensions according to a plurality of items. A slot can be defined by a first movable/removable divider and a second movable/removable divider.

The dynamically sized put wall can include a row having a laterally movable divider; a light bar disposed adjacent to the row, in communications with a put wall controller and having an actuator and a light assembly; a set of controller computer readable instructions included in the put wall controller that, when executed by a processor, are configured to: receive a desired width for a slot; actuating an initial light bar segment representing a location to place the laterally movable divider to define the slot. The system can include receiving a first acknowledgement that the laterally movable divider has been positioned according to an actuator included in the light assembly or associated with the light bar. The first acknowledgement can be a divider placement acknowledgement. The system can receive a slot location representing a location on the row to place an item, actuating a second light bar segment associated with the slot where the item is to be placed, and receive a second acknowledgement that the item has been placed in the slot. The second acknowledgement can be a placement acknowledgement or a put acknowledgement.

The put wall controller can be in communications with an order management system and the controller can be configured to receive the desired width for a slot according to a set of dimensions of a set of items of an order associated with the slot. The controller can include a set of controller computer readable instructions that can perform the functionality described herein.

The controller can be configured to receive the desired width for a slot according to the size of an aggregation of items. A container can be received in the slot for receiving items. The container can include a container indicator such as a bar code or can have an indicator applied to identify the contents of the container with an order. The indicator can be transmitted to the order management system. The light bar segment can be the width of the associated slot so that the worker knows the slot in which to place or retrieve items. A break point can be indicated between the second light bar segment and a third light bar segment to delineate adjacent slots and light bar segments for placement of dividers. The actuator can be a proximity switch configured to provide the put wall controller with the second acknowledgement. The light bar segment can display a first color representing where a first worker is to place a first item into the slot and a second color representing where a second worker is to place a second item into the slot. The put wall slot can include a first side and a second side wherein the second side can include a completion indicator that is activated by the put wall controller when an order associated with the slot contains all items associated with the order. The container size identifier to be used to place items from the slot into the container can be displayed for the worker. A display can be included in the put wall and, for example, attached to the rear of the slot for indicating which container size to use to receive the items retrieved from the slot. In one embodiment, the display can display a first indicator that has a worker identified and a second indicator that can be a quantity of the item to place into the slot.

The system can include a row having a laterally movable divider defining a slot wherein a slot width is determined from an order management system or other computer system and communicated to a put wall controller; a light bar disposed adjacent to the row, in communications with the put wall controller, and having a light assembly; the controller can be configured to receive a slot location representing a location on the row to place an item, actuating a light bar segment associated with the slot location where the item is to be placed and wherein the light bar segment is the width of the slot.

The put wall controller can be in communications with an order management system and configured to receive an order with a list representing the items to be placed in the slot. When an item is identified, such as by scanning the item, the put wall controller can activate a light bar or light assembly to indicate where the item is to be placed. In one embodiment, the controller can be configured to receive an acknowledgement that the item has been placed in the slot. The acknowledgement can be the scanning of an identifier of the next item to be placed in one or more slots. The controller can also be configured to receive an acknowledgement that the item has been placed in the slot from an actuator included in the light assembly. The controller can be configured to receive the container indicator to associate the order with items retrieved from the slot with a container and can transmit the container information to the order management system and indicate that the order has been completed or is in an incomplete status.

The system can include a row having a laterally movable divider defining a slot wherein a slot width is determined from an order management system or server and communicated to a put wall controller; a light bar associated with the row and in communications with the put wall controller; a controller that can be configured to: receive a slot location representing a location on the row to place an item, actuating a light bar segment associated with the slot location where the item is to be placed.

BRIEF DESCRIPTION OF THE SEVERAL VIEWS OF THE DRAWINGS

The construction designed to carry out the system will hereinafter be described, together with other features thereof. The system will be more readily understood from a reading of the following specification and by reference to the accompanying drawings forming a part thereof, wherein an example of the system is shown and wherein.

DETAILED DESCRIPTION OF THE SYSTEM

With reference to the drawings, the system will now be described in more detail.

Figure 1A:
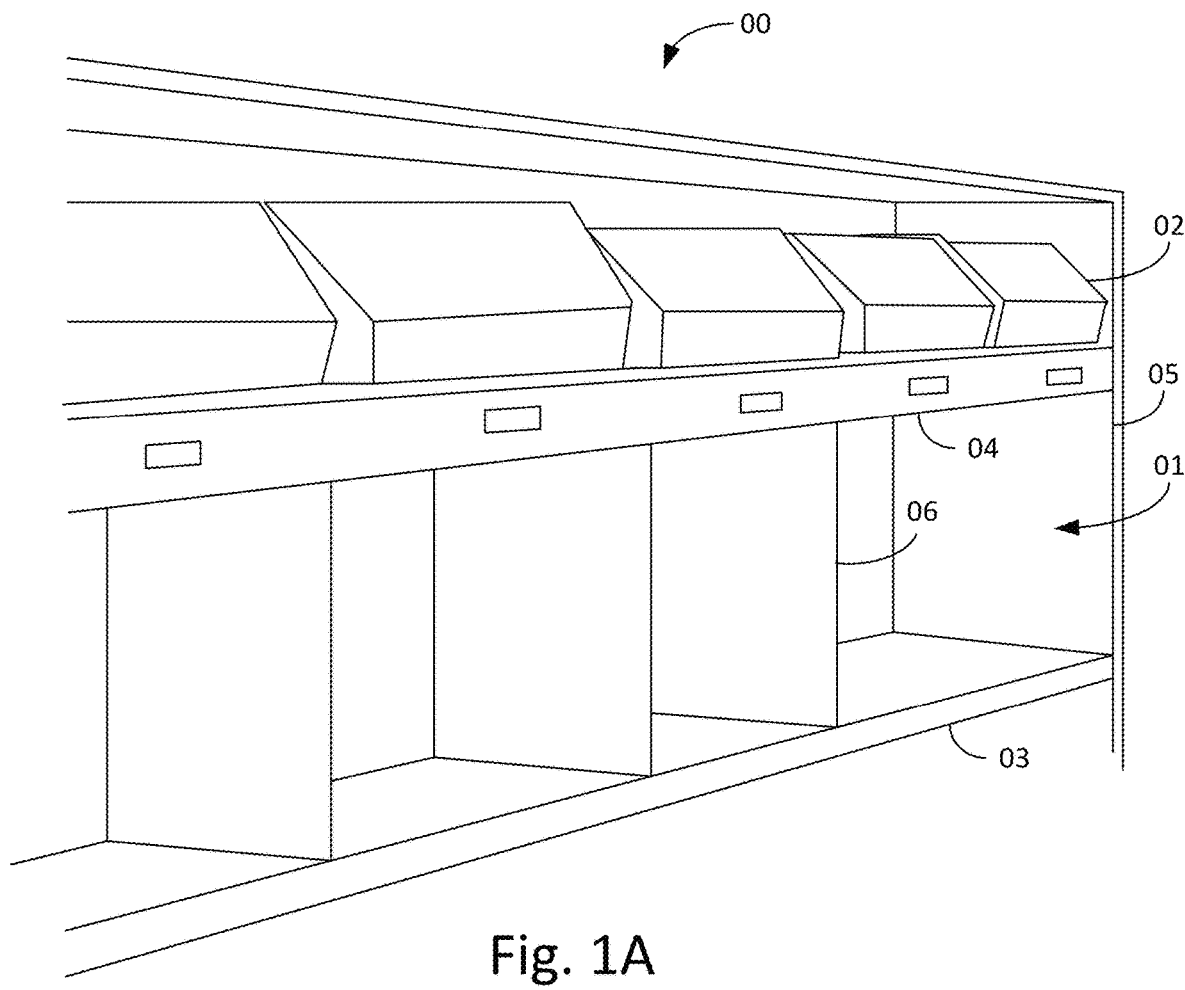
FIG. 1A is illustrations of the prior art.
Figure 1B:
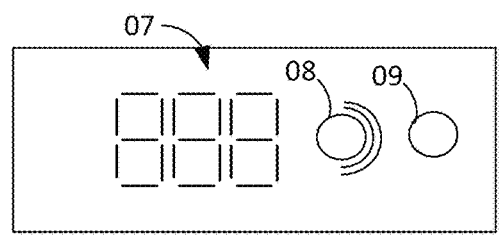
FIG. 1B is illustrations of the prior art.
Figure 2A:
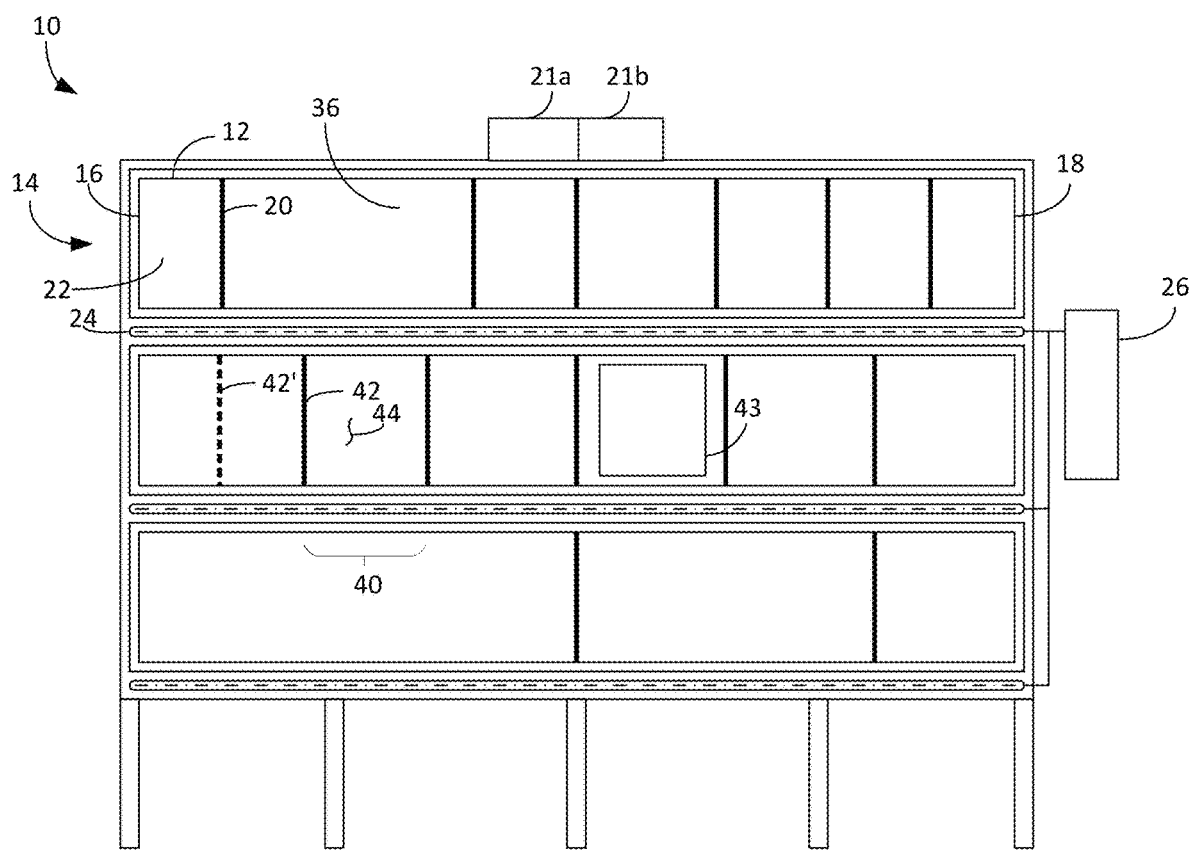
FIG. 2A is an elevation view of the front of aspects of the system.

Referring to FIG. 2A, this system includes a put wall 10 that includes a matrix of slots 12 that can be arranged in rows 14 and defined by at least one of a first end 16 and a second end 18 and a divider 20. Slots can include a static height and depth and dynamic width dimension, static depth and dynamic height and width dimension, static width and depth and dynamic height dimension or any combination. In one embodiment, the horizontal partitions of the row can be vertically positioned to increase or decrease the height of a row. In one embodiment, when the height of a first row is decreased, the height of the second row can be increased. A slot can be adapted to receive a container 43 that can be for receiving the item retrieved from the slot.

The controller can receive orders and associate a slot with the order. The width of the slot can be determined by the order management system or server and according to the dimensions of the items to be placed on the slot. The width of the slot can be determined by a width calculating module that can receive an order and according to the dimensions of the items in the order, determine the width of the slot where the items are to be placed and communicate the width to the light bar controller. The width calculating module can be included in a server or can be computer readable instructions included in the order management system, light bar controller or can be on a remote computer system accessible by the order management system and the light bar controller. The width of the slot can be determined by the controller computer readable instructions according to receiving an order and according to the dimensions of the items in the order. The controller can be configured to determine the width by calculating the width or receiving the width from the order management system or width calculating module.

Each slot 22 can define an opening into which items can be placed into the slot. According to the list of Items in an order, the items can be grouped into separate item sets (i.e., sub-orders) that can be grouped according to the dimensions of the item and an associated container. When the container is selected according to the dimension of the items in the order (or sub-order) the speed of filling the order can be increased.

The slot can be open in the forward and rearward face of the slot and adapted to allow putting items into one face and removing items from the other face. A light bar 24 can be disposed adjacent to all the slots or adjacent to each row of slots. The light bar can be above, below or to the side of a slot. The light bar can also be contained in the slot such as along an interior peripheral edge. The light bar can include one or more light segments having individual lights such as LEDs. The light bar can extend across the length of the row of shelf. A light segment can be included in the light bar and can be illuminated in response to identifying an item and to represent into which slot it is to be placed on the put wall. For example, the light segment can be illuminated as the results of scanning a barcode associated with an item so that the worker is shown where the item is to be placed on the put wall. Therefore, the system can assist the worker in putting each item into a slot by calling attention to the slot into which the item should be placed or put. The put wall can include a quantity indicator that can be actuated with a light segment included in the light bar. The quantity indicator can include a first indicator 21a that can identify a worker and a second indicator 21*b* that can identify a quantity. If more than one items is to be placed on the indicated slot, the worker can be informed with a display on the put wall or scanner so that the quantity to be put is known. The display or scanner can include an indicator such as "3-1" to indicate worker number "3" should place quantity "1" of the selected item into the indicated slot.

The light bar can include a series of lights that run along the light bar. Controller computer readable instructions can be associated with a put wall controller 26 that can determine which segment of the light bar to illuminate so that that a worker is given the proper indication as to the location on the matrix to place the item.

The controller can include a configuration mode. In the configuration mode, a divider 20 can be laterally movable or otherwise placed along the row to define an opening having a width dimension of slot 22. The width dimension is dynamic and can be determined by the aggregate sizes and orientations of the ordered items to be placed into the slot. For example, slot 22 may be for an order with smaller items such as shampoos, shirts, books and the like while slot 36 can be for an order that includes larger items such as shoes, sporting equipment, countertop kitchen appliances and the like. The dimensions of put wall slots can be modified in advance of the commencement of putting operations (i.e., put mode) so dividers can be relocated and subsequently define slot boundaries. The light bar can include a plurality of lights that run along the light bar 24 and can be segmented into discrete widths corresponding with a desired width of the slot. For example, if the desired width of the slot is 40, the light bar can indicate this desired width by illuminating the lights in the segment 40 indicating that the divider in original position shown by 42' should be moved to its position 42 associated with the desired slot width. In operation, one or more of the lights in the segment in the width 40 can be illuminated indicating that items should be placed in slot 44. Because the dividers can be moved, one or more lights in the light segment can be associated with the slot width, the slot dimension width can be dynamically computed in real time, light segments illuminated with alternating colors in adjacent light segments and dividers placed between segments without modifications to the light bars.

Figure 2B:
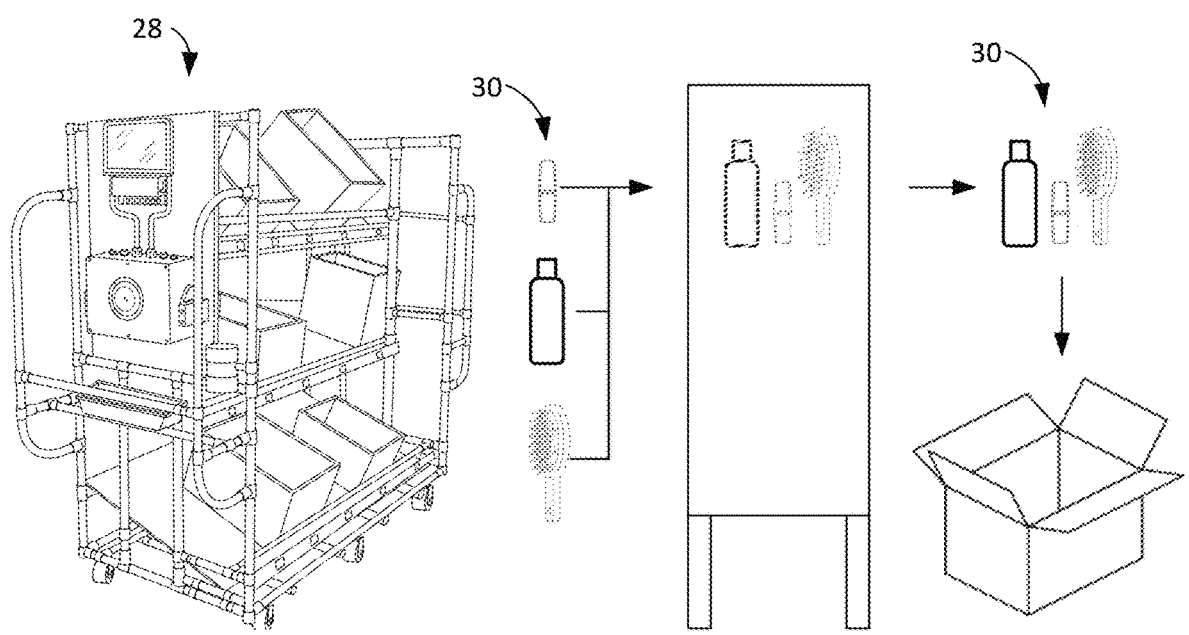
FIG. 2B is a schematic of aspects of the system.
Figure 2C:
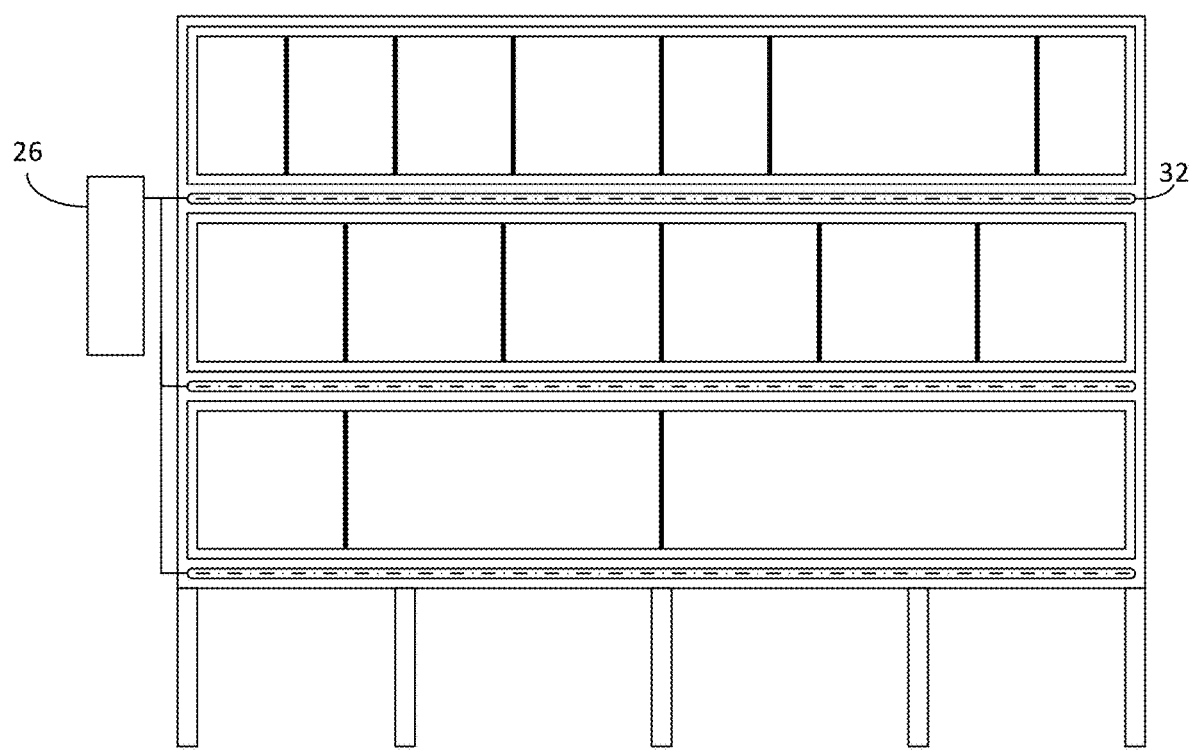
FIG. 2C is an elevation view of the rear of aspects of the system; and,
FIG. 3 is a schematic of aspects of the system.

Referring to FIG. 2B, the worker can select items 30 from a variety of sources including, shelves, containers, cartons, totes, pallets, zones, racks, or carts 28 and place the items in a slot associated with an order. When all items required for a set of items or order have been put into a slot, the indicator 32 (FIG. 2C), actuated by the light controller 26 on the rear of the put wall, can be illuminated to inform the worker that the set of items in that opening is complete and the items 30 can be removed from the opening and placed in a shipping container 34.

In one embodiment, the worker can place a container on the row and move one or more dividers so that the dividers are adjacent the container. The worker can then input the position of one or more dividers using an actuator included in the light assembly to provide input as to the location of the dividers along the row to the put wall controller. Once entered, the put wall controller can actuate the segment of the light bar when an item is to be placed on the container.

In operation the put wall can also be used for returned items management. When items are returned to the warehouse, and can be determined to be resalable, the returned items can be placed into slots. The determination of which slots to place the item can be made according to the item inventory location of the item in the facility. Without a structured returned product process, the process can be inefficient and time consuming. The current put wall seeks to improve the efficiency of returns processing by reducing the time and cost associated with putting products back into inventory locations. For example, when items are returned, they can be placed in a slot that is associated with a section comprised of multiple contiguous locations in the facility. A first slot may be associated with a first section and a second slot can be associated with a second section. When these items are retrieved from the slots, the items are can be transported to the first section and then second section reducing the travel time, and therefore completion time, of the placement of returned items into sections.

Figure 3:
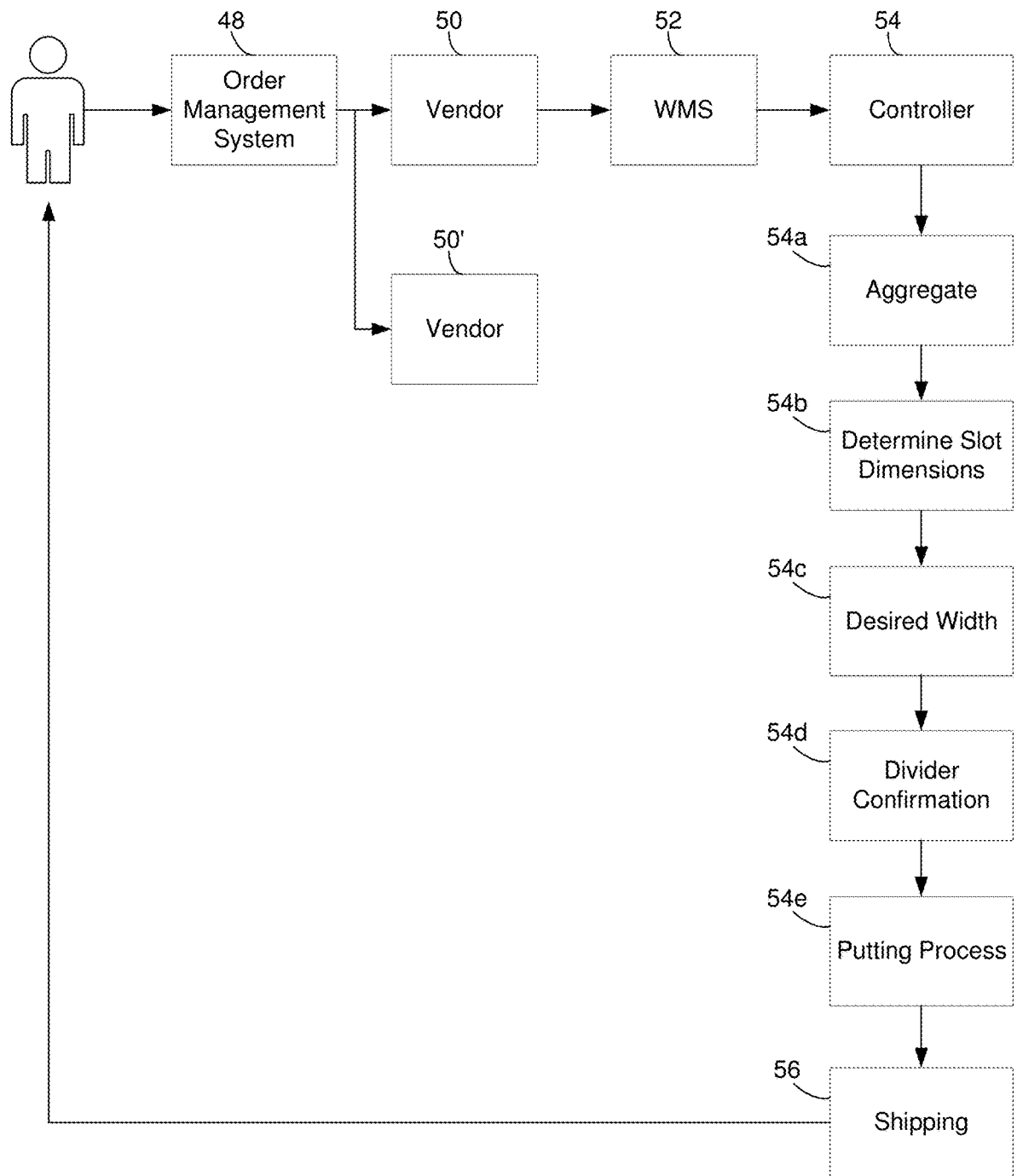

Referring to FIG. 3, a system 48 can receive customer orders for items. The system 48 can include an order management system that can be or include a warehouse management system, an order fulfillment system, an online ecommerce system, an inventory management system, an enterprise resource planning system, an accounting system, and any combination thereof. The entire order can be sent to one or more fulfillment vendors 50 and 50' for fulfillment. The order can be entered into the vendor's fulfillment system such as a warehouse management system 52. A controller 54 that can include computer readable instructions can be in electronic communications with system 52, allowing the transmission of data between the two systems. The computer readable instructions in the server can aggregate orders at 54*a*, determine slot dimensions for the put wall according to one or more orders at 54*b*, send instructions to the put wall controller to indicate the desired width of one or more slots at 54*c*, receive confirmation that one or more dividers have been laterally moved or removed according to the light bar at 54*d*, and begin the putting process at 54*e*; transitioning from configuration mode to put mode. Once the order has been completed the items can be retired from the slot and placed in a container for shipping to the customer at 56. The system can also recommend or indicate a container to be used to receive the items that are retrieved from the slot.

The system can include a server that has server computer readable instructions that, when executed by a processor included with the server, can automatically partition orders into mutually exclusive sub-orders (e.g., order cartons) of specific items so that wasted space in a shipping carton is minimized. The sub-orders can be processed to determine the optimal size put wall slot dimension that should be used to contain each sub-order seeking to minimize empty space. Once the sub-orders are determined, the computer readable instructions can assign sub-orders to put wall locations and slots in the put wall and be adapted to reduce or minimize the wasted slot space on all put walls.

In one example of operation, items are positioned near a put wall in containers (e.g., totes) after having been picked in bulk for distribution into put wall slots associated with a batch of items. The containers for each batch can be kept physically together. Each container can have an associated identifier (e.g., a barcode on the container) that can be used to identify the sub-order. The computer readable instructions can cause the put wall controller to illuminate a segment of lights adjacent to each slot with the length of each light segment equal to the width of the slot assigned to the order set to be put into the slot. The light can alternate in color so that the location of the break points between slots is easily determined. Dividers can be positioned at the break points between the light segment to define slot boundaries and keep items put into slots from accidentally being placed in adjacent slots.

In one example of operation, a worker (i.e., a putter) on the front side of the put wall can scan an item and if all units of a product type can be confidently kept together in the bulk container, lighted displays on one or more slots on the front of the put wall face will be illuminated with the quantity of the product type to be put into each slot. If all units of a product type cannot be confidently kept together in the bulk container, one method can be used where only a single unit of a product in the bulk tote can be identified when scanned (e.g., bar code scanning) and a lighted display associated with a slot on the front of the put wall face will be illuminated indicating the slot into which slot should receive the unit.

As one or more units of the scanned product are put into one or more slots, an actuator such as a button or proximity switch can be associated with the one or more slots and can be activated to signal confirmation or acknowledgement of the put operation into the one or more slots.

When all required items have been placed into a slot, an order completion indicator on the rear of the slot or otherwise on the put wall and may be actuated, signifying all items required for the order have been placed into the slot. One or more packing workers on the rear side of the put wall can each have a scanner with an identifier associated with the scanner (e.g., a number or a color dot such as red, blue, green, etc.). This identifier may be used to make the association between the slot and packer allowing the packer to know which slot has items to retrieve and place into a container. The packer identifies (e.g., using the packer's scanner indicator number or color) the slot having the same or associated light bar indicator (e.g., red) where the packer is to retrieve items. A light assembly associated with the scanner can also include a container identifier indicating which container has been determined by the computer readable instructions to be best suited for packing the contents of the identified slot with the goal of minimal wasted space.

The packer can then select and erect, if needed, a container that corresponds to the container size identifier displayed in the light assembly associated with the slot. The container can also be selected from a container replenishment system as described in United States Patent Application Publication 2019/0300284 and incorporated by reference. The packer can then apply a unique container identifier (e.g., a unique license plate number label) to the container, retrieve the contents from the slot and pack the items from the slot into the carton, and scan the container identifier associating the identifier with the order packed from the slot. The container identifier and order identifier of the container contents can be transmitted or stored in a database for later access and processing.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the system should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A dynamically sized put wall comprising:
    a row having a laterally movable divider;
    a light bar disposed adjacent to the row;
    a put wall controller in communications with the light bar wherein the put wall controller is configured to:
        determine a desired width for a slot,
        actuate an initial light bar segment that represents a first location to place the laterally movable divider to define the slot according to the desired width,
        receiving a slot location representing a second location on the row to place an item,
        actuating a second light bar segment associated with the slot where the item is to be placed,
        receiving a put acknowledgement that the item has been placed in the slot; and,
    wherein the put wall controller is configured to receive a placement acknowledgement representing that the laterally movable divider has been positioned according to the desired width.

2. The dynamically sized put wall of claim 1 including an actuator configured to provide the put wall controller with the placement acknowledgement.

3. The dynamically sized put wall of claim 1 including:
    a scanner in communication with the put wall controller;
    wherein the item is a first item; and,
    a second put acknowledgement representing that a second item has been scanned for placement on the put wall.

4. The dynamically sized put wall of claim 1 including an actuator in communication with the put wall controller and configured to provide the put acknowledgement representing that the item has been placed on the put wall.

5. The dynamically sized put wall of claim 1 wherein the put wall controller is in communication with an order management system and the put wall controller is configured to determine the desired width for the slot according to a set of dimensions of each item in a set of items of an order associated with the slot wherein the order is received from the order management system.

6. The dynamically sized put wall of claim 1 wherein the put wall controller is configured to determine the desired width for the slot by receiving the desired width from an order management system.

7. The dynamically sized put wall of claim 1 wherein the put wall controller is configured to receive the desired width for the slot according to a set of items associated with an order.

8. The dynamically sized put wall of claim 7 wherein the put wall controller is configured to receive the desired width for the slot according to a set of items to be returned to inventory.

9. The dynamically sized put wall of claim 1 wherein a light bar segment width is equal to the desired width of the slot.

10. The dynamically sized put wall of claim 1 including a break point between the second light bar segment and a third light bar segment to delineate adjacent slots.

11. The dynamically sized put wall of claim 1 wherein the initial light bar segment displays a first color associated with a first worker and a second color associated with a second worker.

12. The dynamically sized put wall of claim 11 wherein the first color is associated with a first slot and the second color is associated with a second slot.

13. The dynamically sized put wall of claim 1 wherein the initial light bar segment displays a first color representing where a first worker is to place a first item into the slot and a second color representing where a second worker is to place a second item into the slot.

14. A dynamically sized put wall comprising;
a row having a laterally movable divider;
a light bar disposed adjacent to the row;
a put wall controller in communications with the light bar wherein the put wall controller is configured to:
determine a desired width for a slot,
actuate an initial light bar segment that represents a first location to place the laterally movable divider to define the slot according to the desired width,
receiving a slot location representing a second location on the row to place an item,
actuating a second light bar segment associated with the slot where the item is to be placed,
receiving a put acknowledgement that the item has been placed in the slot; and,
a first side and a second side of the slot wherein the second side includes a completion indicator that is activated by the put wall controller when a set of items in the slot are to be retrieved.

15. The dynamically sized put wall of claim 14 wherein the put wall controller is configured to activate a completion indicator carried by the put wall and when an order associated with the slot has a status taken from the group consisting of complete, hold and short.

16. The dynamically sized put wall of claim 1 including a container identifier indicating a container type to receive a set of items retrieved from the slot.

17. A dynamically sized put wall comprising:
a row having a laterally movable divider disposed on the row according to a slot width;
a light bar having a first segment adjacent to a first slot and a second segment adjacent to a second slot;
a put wall controller in communications with the light bar and configured to:
receive a first slot location representing a location on the row to place a first item,
actuating a first bar segment associated with the first slot location where the first item is to be placed,
receive a second slot location representing a second location on the row to place a second item,
actuate a second bar segment associated with the second slot location representing where the second item is to be placed; and,
a first side and a second side wherein the second side includes a container identifier representing a container type to be selected by a worker and to receive a set of items retrieved from the first slot location.

* * * * *